Sept. 22, 1970     M. L. BENJAMIN ETAL     3,529,843
QUICK CHANGE CHUCK
Filed Nov. 26, 1968
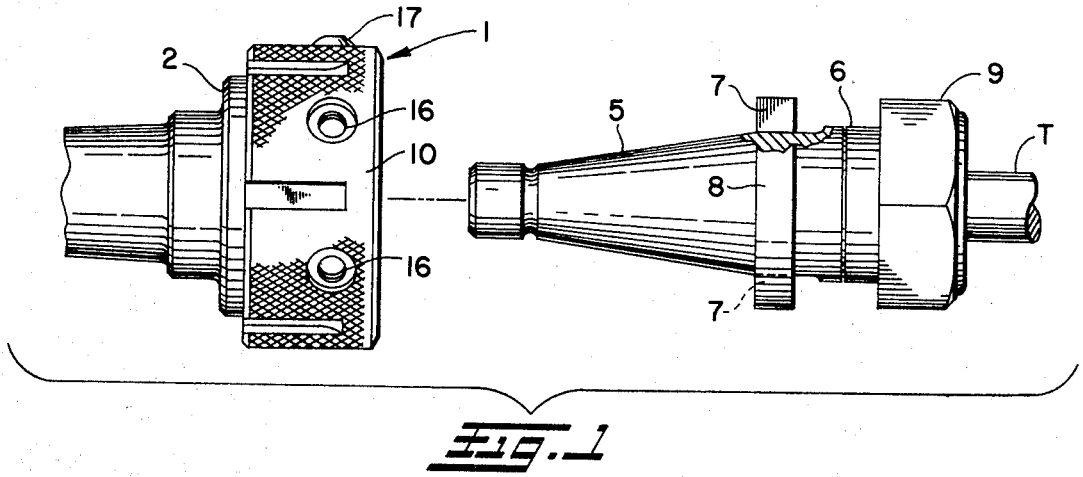
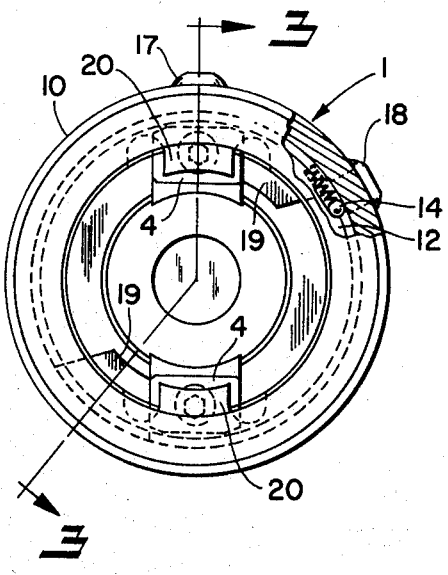
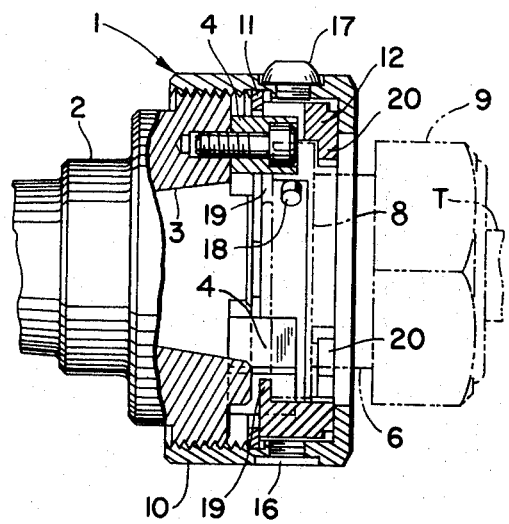
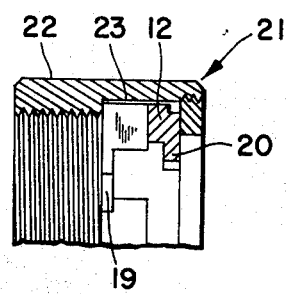
INVENTORS
MILTON L. BENJAMIN
DAVID D. WALKER
BY *Oberlin, Maky, Donnelly & Renner*
ATTORNEYS 3,529,843
QUICK CHANGE CHUCK
Milton L. Benjamin and David D. Walker, Chagrin Falls, Ohio, assignors to Erickson Tool Company, Solon, Ohio, a corporation of Ohio
Filed Nov. 26, 1968, Ser. No. 779,056
Int. Cl. B23b 31/10
U.S. Cl. 279—91                    18 Claims

ABSTRACT OF THE DISCLOSURE

A quick change chuck wherein a slotted flange, tapered shank tool mounting member is clamped to and released from a holder by part turn rotation of a clamping and releasing nut assembly which includes a nut member having threaded engagement with the holder, and a clamping and releasing ring having clamping and releasing lugs to engage opposite sides of the flange of the tool mounting member thus to clamp the tool mounting member to the holder and to release the tool mounting member from the holder upon turning of the nut assembly in opposite directions.

BACKGROUND OF THE INVENTION

It is known as disclosed for example in the Milton L. Benjamin et al. U.S. Pats. 2,727,748, dated Dec. 20, 1965, and 3,380,746, dated Apr. 30, 1968, to provide a quick change chuck in which the clamping nut is integrally formed with lugs for engaging the flange of a tool mounting member to clamp the latter to a holder which has keys interfitting slots in said flange and a tapered socket in which the shank of said member is seated. In such known quick change chuck the nut is provided with a stop means to engage one side of a holder key thus to align the clamping lugs with the holder keys so that the slotted flange tool mounting member may be readily inserted with the slots of the flange fit over the holder keys. In such known construction where the clamping lugs are integral with the nut and wherein the stop means thereof engages a holder key, clamping adjustment can be made only in 180° increments and therefore the nuts manufactured by one manufacturer may not be interchangeable or usable on holders made by others. Furthermore, in the event of wear of the clamping lugs or variation in thickness or axial location of the flange of the tool mounting member, the positioning of the nut stop means at one place may just engage the flange within the limits of clamping rotation of the nut whereby firm clamping can only be achieved by removing metal from the axially inner faces of the clamping lugs and advancing the nut 180° with reinsertion of the stop means.

SUMMARY OF THE INVENTION

Contrary to the foregoing, the quick change chuck herein is provided with a clamping nut which has rotatable therewithin a clamping and releasing ring in which the releasing lugs are adapted to engage the holder keys when the clamping lugs thereof are aligned with said keys. The clamping nut has several threaded holes around its periphery for selective insertion of a stop screw to engage one side of a releasing lug to urge said ring to its aforesaid stop position aligning the clamping lugs with the holder keys when it is desired to insert or remove a tool mounting member.

Accordingly, it is one principal object of this invention to provide an adjustable clamping nut assembly which compensates for wear of the parts thereof and which also enables the clamping nut assembly to be interchangeably fitted to any holder.

Another object of this invention is to provide a quick change chuck as aforesaid wherein the nut hole spacing is such that an empty hole will be aligned with a holder key for insertion of a bright or colored head screw to assist an operator in insertion of a tool mounting member.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

FIG. 1 is an exploded side elevation view of a holder in position ready for insertion of tapered shank, slotted flange tool mounting member to a position where part turn rotation of the nut will clamp the tool mounting member in the holder;

FIG. 2 is an end elevation view of the holder as viewed from the right-hand end thereof with a portion of the nut broken away to show friction means to cause initial rotation of the nut and clamping and releasing ring in unison;

FIG. 3 is a cross-section view taken substantially along the line 3—3, FIG. 2; and FIG. 4 is a fragmentary cross-section view of a modified form of clamping and releasing nut assembly.

DISCUSSION OF THE INVENTION

As shown in the drawing, the quick change chuck 1 herein comprises a holder 2 which is adapted to be secured to a spindle of a milling machine, boring mill, drill press, or the like, or fashioned to be mounted to, for example, a lathe turret. The end of the holder 2 is provided with a tapered socket 3 and a pair of axially extending keys 4, the socket 3 being adapted to receive the correspondingly tapered shank 5 of a tool mounting member 6, and the keys 4 being adapted to extend axially into the slots 7 of the flange 8 of the tool mounting member 6, thus to hold the latter against rotation with respect to the holder 2.

The tool mounting member 6 is herein shown as having a collet chuck 9 adapted to hold a drill, a reamer, or like tool T. It is to be understood that the tool mounting member 6 may be fashioned for mounting an end mill, a shell and face mill, a boring head, a tapered shank drill or the like.

In screw threaded engagement with the holder 2 is a nut member 10 in which is held, by a snap ring 11, a clamping and releasing ring 12 which is frictionally engaged with the nut member 10 to rotate in unison therewith during the initial turning of the nut member 10 in clamping direction by one or more spring press plungers 14 which engage the wall of the nut member 10 bore.

The nut member 10 has a series of circumferentially spaced openings 16 for reception of a bright or colored head screw 17 which, when the chuck 1 is in position for insertion of a tool mounting member 6 denotes the location of the keys 4 which may be difficult to see by the operator as when the holder 2 is attached to a vertical spindle. In another one of said holes 16 is a stop screw 18 which engages one side of a releasing lug 19 of the ring 12 to move the ring 12 in a counterclockwise direction to a stop position whereat the opposite sides of said releasing lugs 19 are engaged with one side of said keys 4 as best shown in FIG. 2.

The clamping and releasing ring 12 has a pair of clamping lugs 20 circumferentially and axially offset from said releasing lugs 19 and adapted to engage the axially outer surface of the slotted flange 8 of the tool mounting member 6 when the latter is inserted in said holder 2 to thereby seat the shank 5 in the socket 3. As aforesaid said ring 12 has a pair of releasing or ejecting lugs 19 which are adapted to engage the axially inner surface of the flange 8 thus to release or pull out the tapered shank 5 from the tapered socket 3 of the holder 2.

In operation, when the nut member 10 is turned to its extreme counterclockwise position as viewed in FIG. 2 the end of the stop screw 18 engaging one side of an ejecting lug 19 to cause both ejecting lugs 19 to contact one side of said keys 4. In this position of said ring 12, the clamping lugs 20 are aligned with the keys 4 and thus the slotted flange 8 of a tool mounting member 6 may be axially inserted so that the keys 4 extend into the slots 7 and so that the axially inner face of the flange 8 is engaged with the ledges of the releasing or ejector lugs 19, the tapered shank 5 being out of engagement with the tapered socket 3 of the holder 2. At this time, with the tool mounting member 6 inserted, the axially inner faces of the clamping lugs 20 are outwardly spaced from the axially outer face of the flange 8 whereby as the clamping nut member 10 is now turned in a clockwise direction as viewed in FIG. 2, the clamping and releasing ring 12 will turn therewith in unison, and, as the turning of the nut member 10 continues the inner faces of the clamping lugs 20 will engage the axially outer end face of the flange 8 to press the tapered shank 5 into seating engagement in the tapered socket 3 and, of course, as the nut member 10 is turned the releasing lugs 19 are moved axially away from the axially inner face of the flange 8.

When it is desired to release the tool mounting member 6, the nut member 10 will be turned in a counterclockwise direction and when the screw 18 engages one side of one of the releasing lugs 19 the clamping and releasing ring 12 will be turned in unison with the nut until the releasing lugs 19 engage one side of the keys 4 as shown in FIG. 2 at which time the clamping lugs 20 are aligned with the keys 4. During this counterclockwise rotation, the releasing or ejector lugs 19 engage the axially inner face of the flange 8 to release the shank 5 from the socket 3.

If it be desired to use the nut assembly 10, 11, 12 with another holder 2, or in the event of wear of the flange 8 or of the clamping and ejecting lugs 20 and 19, the screws 17 and 18 may be removed and the nut member 10 turned until desired clamping and ejecting action is achieved. The screws 17 and 18 are then reinserted in the holes 16 so that screw 17 denotes the position of keys 4 and so that screw 18 engages one releasing lug 19 at the stop position whereat both lugs 19 engage the respective keys 4. It can be seen that in the present case when six equally spaced holes 16 are provided, adjustment can be made in one-sixth turn (60°) intervals to achieve desired clamping and releasing within a part turn rotation of the nut member in opposite directions.

In the present case, the maximum rotation of ring 12 in the clamping direction is limited to an angle of about 90° from the FIG. 2 position, i.e., until the lower edge of upper lug 19 engages the right-hand side of lower key 4 and the upper edge of lower lug 19 engages the left-hand side of upper key 4. The rotation of nut member 10 may be continued thereafter with the stop screw 18 passing the lower key 4 until it engages the then lower side of lug 19 which is engaged with the upper key 4.

In the modified nut assembly 21 shown in FIG. 4, the nut member 22 is counterbored at 23 and a retaining ring 24 is screwed into place and locked to retain the clamping and releasing ring 12 in axial position within the nut member 21. Otherwise, the FIG. 4 nut assembly 21 is similar to that disclosed in FIGS. 1 to 3.

We, therefore, particularly point out and distinctly claim as our invention:

1. In a quick change chuck of the type wherein a holder has a socket to receive the shank of a flanged tool mounting member and a pair of keys to axially interfit slots in the flange of said member, the improvement which comprises a nut having threaded engagement with said holder and having an opening for passage of said flange therethrough; a ring axially retained in said nut having radially inwardly extending clamping lugs to engage the axially outer face of said flange upon rotation and axial inward movement of said ring and nut thus to clamp said member in said holder; stop means on said ring engageable with one of said keys to position said clamping lugs in alignment with said keys whereby said member may be axially inserted into or withdrawn from said holder; and circumferentially adjustable stop means between said nut and ring to rotatively position said nut with respect to said ring so that said flange will be engaged by said clamping lugs within a part-turn rotation of said nut and ring.

2. The chuck of claim 1 wherein said stop means is also engageable with the other key to limit the degree of clamping rotation of said ring; wherein frictional drag means between said nut and ring effects initial clamping rotation thereof in unison; and wherein said adjustable stop means is arranged to permit continued clamping rotation of said nut through said drag means when clamping rotation of said ring has been arrested as aforesaid.

3. The chuck of claim 1 wherein said adjustable stop means comprises circumferentially spaced radial holes through said nut and a stop element in a selected one of said holes to engage said ring.

4. The chuck of claim 3 wherein an unused hole is radially aligned with one of said keys when said clamping lugs are aligned with said keys and is adapted to be distinguished from other unused holes and from said stop element to facilitate insertion of said member into said holder.

5. The chuck of claim 1 wherein said ring had radially inwardly extending releasing lugs that are axially inwardly spaced and circumferentially offset from said clamping lugs to engage the axially inner face of said flange upon rotation and axial outward movement of said ring and nut thus to release said member from said holder.

6. The chuck of claim 5 wherein one releasing lug constitutes said stop means.

7. The chuck of claim 6 wherein said one releasing lug is also engageable with the other key to limit the degree of clamping rotation of said ring; wherein frictional drag means between said nut and ring effects initial clamping rotation thereof in unison; and wherein said adjustable stop means is arranged to permit continued clamping rotation of said nut through said drag means when clamping rotation of said ring has been arrested as aforesaid.

8. The chuck of claim 7 wherein said adjustable stop means comprises circumferentially spaced radial holes through said nut, and a stop element in a selected one of said holes to engage one releasing lug during releasing rotation of said nut; and wherein said stop element passes one key and engages the other releasing lug during clamping rotation of said nut.

9. The chuck of claim 8 wherein an unused hole is radially aligned with one of said keys when said clamping lugs are aligned with said keys and is adapted to be distinguished from other unused holes and from said stop element to facilitate insertion of said member into said holder.

10. The chuck of claim 1 wherein said ring is axially retained in said nut between a radially inwardly extending shoulder in said nut and a retaining ring secured to said nut.

11. The chuck of claim 10 wherein said retaining ring comprises a snap ring engaged in an internal groove in said nut.

12. The chuck of claim 10 wherein said retaining ring comprises a ring threaded into said nut.

13. A nut assembly for a quick-change chuck comprising an internally threaded nut adapted to be screwed onto a holder having an axially projecting key; said nut having axially spaced shoulders adjacent the threads; a ring axially retained in said nut between said shoulders; said ring having a radially inwardly extending clamping lug adapted, upon rotation and axial inward movement of said nut and ring, to engage the axially outer face of the slotted flange of a tool mounting member adapted to be inserted through said nut with the lug passing through a flange slot into axially interfitting relation with the holder key; and circumferentially adjustable stop means between said nut and ring to rotatively position said nut with respect to said ring so that part-turn rotation of said nut and ring from a position whereat said lug is aligned with such key will effect engagement of said lug with such flange.

14. The assembly of claim 13 wherein said ring has a radially inwardly extending releasing lug axially spaced and circumferentially offset from said clamping lug adapted, upon rotation and axial outward movement of said nut and ring, to engage the axially inner face of such flange.

15. The assembly of claim 14 wherein said releasing lug is adapted to engage such key to position said clamping lug in alignment with such key.

16. The assembly of claim 13 wherein stop means is a one-way stop to cause rotation of said nut and ring in unison in one direction; and wherein frictional drag means between said nut and ring effects rotation of said nut and ring in unison in the opposite direction and continued rotation of said nut when rotation of said ring is arrested.

17. The assembly of claim 13 wherein said stop means comprises circumferentially spaced radial holes in said nut, and wherein a stop element engageable with said ring is placed in a selected one of said holes.

18. The assembly of claim 17 wherein the spacing of said holes is such that an unused hole will be aligned with said clamping lug.

References Cited

UNITED STATES PATENTS 2,727,748  12/1955  Benjamin.
3,380,746   4/1968  Benjamin _____ 279—91

ROBERT C. RIORDON, Primary Examiner

D. D. EVENSON, Assistant Examiner